United States Patent [19]

Fogelberg

[11] Patent Number: 4,561,520

[45] Date of Patent: Dec. 31, 1985

[54] MAGNETICALLY SYNCHRONIZED CLUTCH APPARATUS

[75] Inventor: Mark J. Fogelberg, Muncie, Ind.

[73] Assignee: Borg-Warner Corporation, Chicago, Ill.

[21] Appl. No.: 548,589

[22] Filed: Nov. 3, 1983

[51] Int. Cl.$^4$ .............................................. F16D 23/02
[52] U.S. Cl. .................................. 180/247; 192/53 D; 192/67 A; 192/84 C
[58] Field of Search ................ 192/53 D, 53 F, 67 R, 192/67 A, 84 C; 180/247

[56] References Cited

U.S. PATENT DOCUMENTS

| | | | |
|---|---|---|---|
| 1,601,001 | 9/1926 | Sleeper . | |
| 2,306,643 | 12/1942 | Sewell | 192/53 |
| 2,584,116 | 2/1952 | Duyck | 192/53 |
| 2,876,878 | 3/1959 | Sinclair et al. | 192/67 |
| 3,057,447 | 10/1962 | Peras | 192/53 F |
| 3,123,169 | 3/1964 | Young et al. | 180/247 |
| 3,713,519 | 1/1973 | Ruget | 192/53 D |
| 3,921,469 | 11/1975 | Richards | 192/53 F X |

FOREIGN PATENT DOCUMENTS 1056885  5/1959  Fed. Rep. of Germany ... 192/53 D

Primary Examiner—A. Michael Chambers
Assistant Examiner—John C. Fox
Attorney, Agent, or Firm—Julian Schachner

[57] ABSTRACT

Magnetically synchronized clutch apparatus includes a jaw clutch and an electromagnetic synchronizer. The jaw clutch has a rotatable sleeve member and a rotatable shift assembly with a shift member. A spring biases the shift member for engagement with the sleeve member. The shift assembly is slidable to a position in which the members remain disengaged when not rotating in approximate synchronism. The electromagnetic synchronizer brings the members into approximate synchronism upon sliding of the shift assembly.

20 Claims, 4 Drawing Figures

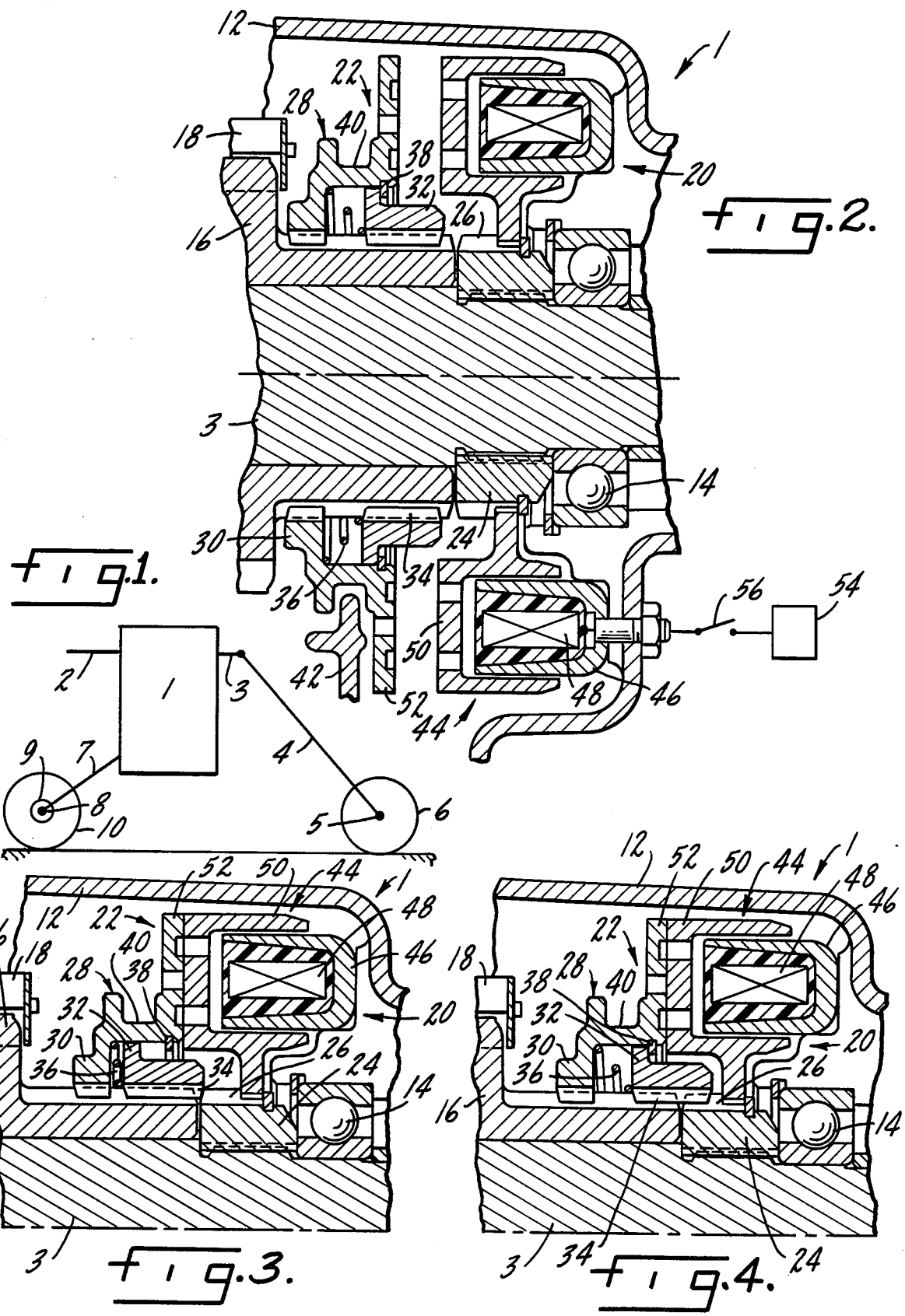

MAGNETICALLY SYNCHRONIZED CLUTCH APPARATUS

BACKGROUND OF THE INVENTION

This invention relates generally to a magnetically synchronized clutch apparatus adapted for use in a four-wheel-drive transfer case. More particularly, it relates to such an apparatus which includes an electromagnetic synchronizer in combination with a spring-loaded jaw clutch.

A four-wheel-drive vehicle typically includes a transfer case for the delivery of power to the front and rear wheels. The transfer case generally delivers power directly to one axle, usually the rear axle, and includes a clutch which is engageable for the delivery of power to the front axle. The vehicle may be equipped with automatic wheel hubs which lock the front wheels to the front axle upon initial rotation thereof.

Under normal operating conditions, the vehicle is driven in the two-wheel-drive operating mode; that is, with power delivered to the rear driveline only. The front driveline is stationary, with the automatic wheel hubs unlocked. In this operating mode maximum fuel economy may be achieved.

When driving conditions require use of the four-wheel-drive operating mode, the transfer case clutch is engaged so as to deliver power to the front driveline. Upon initial rotation of the front axle, the wheel hubs lock to complete the torque delivery path to the front wheels. A disadvantage of this arrangement is that the clutch cannot be engaged at any appreciable vehicle speed without risking damage and/or a potentially dangerous condition, because at such a speed the rear driveline is rotating rapidly and the front driveline is stationary. The vehicle must be moving slowly (below approximately 5 mph) if the clutch is to be engaged without such risks, and without the expenditure of undue force by the vehicle operator.

There is a need in the art for a clutch apparatus which overcomes this disadvantage by being engageable safely at any vehicle speed, and which is fully engageable without necessitating extraordinary effort by the vehicle operator.

SUMMARY OF THE INVENTION

This invention is directed to apparatus which meets this need. To that end, there is provided a magnetically synchronized clutch apparatus which may be incorporated in an automative four-wheel drive transfer case. The apparatus comprises a jaw clutch and an electromagnetic synchronizer. The jaw clutch includes a rotatable sleeve member, and a rotatable shift assembly having a shift member and means biasing the shift member for engagement with the sleeve member. The shift assembly is slidable to an engaged position in which the members do not engage if they are not rotating in approximate synchronism, but in which they do engage under the influence of the biasing means if they are rotating in approximate synchronism. The electromagnetic synchronizer brings the members into approximate synchronism when the shift assembly slides toward the engaged position.

BRIEF DESCRIPTION OF THE DRAWING

The objects and advantages of this invention will become apparent to those skilled in the art upon careful consideration of the specification herein, including the drawing, wherein:

FIG. 1 is a schematic illustration showing the relationship of a four-wheel-drive transfer case and automatic wheel hubs;

FIG. 2 is a sectional view of the magnetically synchronized clutch apparatus of this invention in the disengaged position;

FIG. 3 is a sectional view similar to FIG. 2, showing the apparatus of this invention in the engaged position, but with the clutch not yet engaged; and FIG. 4 is a sectional view similar to FIG. 3, showing the apparatus of this invention in the engaged position, with the clutch engaged.

While this invention is susceptible of embodiment in many different forms, the preferred embodiment is shown in the drawing and described in detail. It should be understood that the present disclosure is considered to be an exemplification of the principals of the invention, and is not intended to limit the invention to this embodiment.

DESCRIPTION OF THE PREFERRED EMBODIMENT

Referring now to the drawing in greater detail, FIG. 1 shows schematically a transfer case 1 adapted for use in a four-wheel-drive vehicle. Transfer case 1 receives power through an input shaft 2. When operating in the two-wheel-drive mode, transfer case 1 delivers power through a first output shaft 3 and a driveshaft 4 to an axle 5, for example the rear axle, for driving the rear wheels 6. When operating in the four-wheel-drive mode, transfer case 1 also delivers power through a second output shaft 7 to another axle 8, for example the front axle, and a pair of automatic wheel hubs 9 for driving the front wheels 10. Suitable automatic wheel hubs are disclosed in my U.S. Pat. Nos. 4,192,411 issued Mar. 11, 1980, 4,281,749 issued Aug. 4, 1981 and 4,300,667 issued Nov. 17, 1981. These patents are of common assignee herewith, and are incorporated herein by reference.

As shown in FIG. 2, transfer case 1 includes a housing 12 supporting a bearing 14. Shaft 3 is a journalled in bearing 14, and extends from housing 12 for connection to rear axle 5 of the vehicle. A drive element 16 in the form of a drive sprocket is journalled on shaft 3. Drive sprocket 16 is coupled by a chain 18 with a driven sprocket (not shown) connected to shaft 7 and front axle 8 of the vehicle.

A magnetically synchronized clutch apparatus 20 includes a spring-loaded jaw clutch 22. Jaw clutch 22 has a sleeve member 24 secured to shaft 3 for rotation therewith. Sleeve member 24 defines a first set of clutch teeth 26. Jaw clutch 22 also has a shift assembly 28 including a shift collar 30 and a shift member 32. Shift collar 30 and shift member 32 are splined to sprocket 16 for rotation therewith and sliding movement relative thereto. The spline of the shift member 32 defines a second set of clutch teeth 34 adapted for meshing engagement with teeth 26 of sleeve member 24. Shift assembly 28 also includes a biasing spring 36 which when compressed reacts against collar 30 and acts upon member 32, biasing it toward a stop 38 in the form of a snap ring or the like supported by collar 30. It should be noted that although spring 36 thus loads member 32, it does not load shift assembly 28. Assembly 28 is freely slidable relative to sprocket 16.

Collar 30 defines an annular groove 40 with which a shift fork 42 is engaged. A shift device (not shown) slides shift fork 42 to the right from the position shown in FIG. 2 in order to initiate engagement of jaw clutch 22, and to the left, back to the position shown in FIG. 2, in order to disengage jaw clutch 22. A suitable shift device is disclosed in my U.S. application Ser. No. 539,452 filed Oct. 6. 1983. This application is of common assignee herewith, and is incorporated herein by reference.

Clutch apparatus 20 also includes an electromagnetic synchronizer 44. Synchronizer 44 has a case 46 secured to housing 12. Case 46 contains a coil 48. A first pole piece 50 in the form of a rotor is secured to sleeve member 24 for rotation with shaft 3. A second pole piece 52 in the form of an armature is defined by or secured to collar 30 for rotation with sprocket 16.

As shown in FIG. 2, transfer case 1 is in the two-wheel-drive operating mode. Power may be directed from shaft 3 to the rear driveline. Jaw clutch 22 is disengaged, so power cannot be directed from shaft 3 to the front driveline.

The operator may shift transfer case 1 to the four-wheel-drive operating mode at any vehicle speed. To do so, he moves the shift device so as to slide shift fork 42, and thus shift assembly 28, to the engaged position shown in FIG. 3. It should be noted that no further effort by the operator is required once this shift has been initiated. Positive engagement may be delayed momentarily, however, as member 24 is rotating and member 32 is not. When they come into contact, teeth 34 ratchet against teeth 26. Spring 36 is compressed, thereby applying a preload biasing force on member 32, urging it toward engagement with member 24.

Movement of the shift device also closes a switch 56 to complete a circuit connecting a suitable power source 54 to coil 48. A convenient switch might be the indicator light switch disclosed in the aforementioned U.S. application Ser. No. 539,452. When coil 48 is energized, it develops a magnetic flux which draws armature 52 toward rotor 50. Armature 52 is thus magnetically engaged with rotor 50, and may be frictionally engaged with it as well. As rotor 50 is rotating, armature 52 also begins rotating. Shift assembly 28 and the front driveline rotate with armature 52, and wheel hubs 9 begin the process of locking wheels 10 to axle 8. At this point very little torque is transferred through synchronizer 44, so member 32 remains freely slidable relative to sprocket 16.

Although there is some initial slip, armature 52 accelerates quite rapidly until it approaches synchronism with rotor 50. When the slip is reduced sufficiently such that members 24 and 32 are in approximate synchronism, teeth 34 slide into meshing engagement with teeth 26 under the influence of biasing spring 36, as shown in FIG. 4. At this point positive engagement between shaft 3 and sprocket 16 is completed. Full torque is transferred through jaw clutch 22. No torque is transferred through synchronizer 44, and power source 54 may be disconnected from coil 48 if desired. Meanwhile, wheel hubs 9 complete the process of locking wheels 10 to axle 8 if they have not already done so.

When the operator desires to shift transfer case 1 to the two-wheel-drive operating mode, he causes power source 54 to be disconnected from coil 48 if it has not already been disconnected. He also causes shift fork 42 to move leftwardly to the disengaged position shown in FIG. 2. This draws member 32 away from member 24, sliding teeth 34 out of meshing engagement with teeth 26. Torque cannot be transferred to the front driveline, so front axle 8 does not rotate. Wheel hubs 9 now may be unlocked in the manner disclosed in the aforementioned U.S. Pat. Nos. 4,192,411, 4,281,749 and 4,300,667.

Thus it will be seen that a magnetically synchronized clutch apparatus is engageable at any vehicle speed. The apparatus includes a jaw clutch and an electromagnetic synchronizer. The jaw clutch is spring-loaded when engagement is initiated. The synchronizer brings two jaw clutch members into approximate synchronism, whereupon engagement is completed automatically. The synchronizer supplies only the relatively small amount of torque required to bring the clutch members into approximate synchronism, after which full load torque is transferred through the jaw clutch.

It should be understood that while a preferred embodiment of the invention has been shown and described, this is to be considered as illustrative and may be modified by those skilled in the art. It is intended that the claims herein cover all such modifications as may fall within the spirit and scope of the invention.

What is claimed is:

1. Magnetically synchronized clutch apparatus comprising a jaw clutch and an electromagnetic synchronizer, said jaw clutch including a rotatable sleeve member, and a rotatable shift assembly having a shift collar, a shift member, and means biasing said shift member for engagement with said sleeve member, said shift assembly being slidable to a disengaged position in which said members are disengaged, said shift assembly also being slidable to an engaged position in which said members remain disengaged when not rotating in approximate synchronism and in which said members are engaged by said biasing means when rotating in approximate synchronism, said electromagnetic synchronizer being energizeable to bring said members into approximate synchronism upon sliding of said shift assembly toward said engaged position.

2. The magnetically synchronized clutch apparatus of claim 1, said biasing means including a spring reacting against said shift collar and acting upon said shift member so as to bias said shift member toward said sleeve member.

3. The magnetically synchronized clutch apparatus of claim 2, said members each defining a set of clutch teeth, said teeth ratcheting when said shift assembly is in said engaged position but said members are not in approximate synchronism, and said teeth being relatively slidable into meshing engagement by said spring to complete clutch engagement when said members are in approximate synchronism.

4. The magnetically synchronized clutch apparatus of claim 1, further comprising means for energizing said electromagnetic synchronizer upon sliding of said shift assembly toward said engaged position.

5. The magnetically synchronized clutch apparatus of claim 1, said electromagnetic synchronizer including a coil, a first pole piece secured to said sleeve member, and a second pole piece secured to said shift assembly.

6. The magnetically synchronized clutch apparatus of claim 5, further comprising means for energizing said coil upon sliding of said shift assembly toward said engaged position.

7. The magnetically synchronized clutch apparatus of claim 5, said second pole piece being secured to said shift collar.

8. The magnetically synchronized clutch apparatus of claim 7, further comprising means for energizing said coil upon sliding of said shift assembly toward said engaged position.

9. In a four-wheel-drive transfer case having an input, a first output establishing a first torque delivery path from the input to a first pair of wheels through a first axle, and a second output engageable with the input for establishing a second torque delivery path from the input to a second pair of wheels through a second axle and a pair of automatic wheel hubs; the improvement comprising a magnetically synchronized clutch apparatus including a jaw clutch having two members engageable on-the-go for engaging said input with said second output, said jaw clutch including a shift assembly movable to initiate clutch engagement, said shift assembly having means for applying a preload force biasing one of said members for engagement with the other of said members when they are rotating in approximate synchronism, and an electromagnetic synchronizer energizeable for bringing said members into approximate synchronism when engagement of said jaw clutch is initiated by said shift assembly.

10. In the four-wheel-drive transfer case of claim 9, said other memer being rotatable with the first output, said shift assembly being rotatable with the second output, said shift assembly including a collar and said one member slidable toward and away from said other member, and a spring which when compressed applies said force on said one member, movement of said shift assembly to initiate clutch engagement sliding said one member into contact with said other member to thereby compress said spring when said members are not in approximate synchronism, said one member being slidable into engagement with said other member by said spring force to complete clutch engagement when said members are in approximate synchronism.

11. In the four-wheel-drive transfer case of claim 10, said members each defining a set of clutch teeth, said teeth ratcheting when said members are in contact but are not in approximate synchronism, and said teeth being relatively slidable into meshing engagement by said spring force to complete clutch engagement when said members are in approximate synchronism.

12. In the four-wheel-drive transfer case of claim 11, said shift assembly also being movable away from said other member to effect clutch disengagement by sliding said teeth relatively out of meshing engagement.

13. In a four-wheel-drive transfer case having an input, a first output establishing a first torque delivery path from the input to a first pair of wheels through a first axle, and a second output engageable with the input for establishing a second torque delivery path from the input to a second pair of wheels through a sexond axle; the improvement comprising magnetically synchronized clutch apparatus including a jaw clutch and an electromagnetic synchronizer, said jaaw clutch including a rotatable sleeve member engaged with one of said outputs, and a rotatable shift assembly engaged with the other of said outputs, said shift assembly having a shift collar, a shift member, and means biasing said shift member for engagement with said sleeve member, said shift assembly being slidable to a disengaged position in which said members are disengaged, said shift assembly also being slidable to an engaged position in which said members remain disengaged when not rotating in approximate synchronism and in which said members are engaged by said biasing means when rotating in approximate synchronism, said electromagnetic synchronizer being energizable to bring said members into approximate synchronism upon sliding of said shift assembly toward said engaged position.

14. The magnetically synchronized clutch apparatus of claim 13, said biasing means including a spring reacting against said shift collar and acting upon said shift member so as to bias said shift member toward said sleeve member.

15. The magnetically synchronized clutch apparatus of claim 14, said members each defining a set of clutch teeth, said teeth ratcheting when said shift assembly is in said engaged position but said members are not in approximate synchronism, and said teeth being relatively slidable into meshing engagement by said spring to complete clutch engagement when said members are in approximate synchronism.

16. The magnetically synchronized clutch apparatus of claim 13, further comprising means for energizing said electromagnetic synchronizer upon sliding of said shift assembly toward said engaged position.

17. The magnetically synchronized clutch apparatus of claim 13, said electromagnetic synchronizer including a coil, a first pole piece secured to said sleeve member, and a second pole piece secured to said shift assembly.

18. The magnetically synchronized clutch apparatus of claim 17, further comprising means for energizing said coil upon sliding of said shift assembly toward said engaged position.

19. The magnetically synchronized clutch apparatus of claim 17, said second pole piece being secured to said shift collar.

20. The magnetically synchronized clutch apparatus of claim 17, further comprising means for energizing said coil upon sliding of said shift assembly toward said engaged position.

* * * * *